United States Patent [19]

Mueller et al.

[11] Patent Number: 5,567,135
[45] Date of Patent: Oct. 22, 1996

[54] RECIPROCATING PUMP

[75] Inventors: Erwin Mueller, Renningen; Wolfgang Schuller, Sachsenheim, both of Germany

[73] Assignee: Robert Bosch GmbH, Stuttgart, Germany

[21] Appl. No.: 564,523

[22] Filed: Nov. 29, 1995

[30] Foreign Application Priority Data

Dec. 1, 1994 [DE] Germany .......................... 44 42 737.9

[51] Int. Cl.⁶ .................. F04B 1/04; F04B 53/12
[52] U.S. Cl. .......................... 417/549; 417/554
[58] Field of Search ...................... 417/554, 549, 417/552

[56] References Cited

U.S. PATENT DOCUMENTS 2,622,539   12/1952   Martin .................................. 417/554 X
3,514,223   5/1970   Hare ..................................... 417/554 X
5,061,159   10/1991   Pryor ........................................ 417/554
5,232,273   8/1993   Eckstein et al. .

FOREIGN PATENT DOCUMENTS 1072050   6/1967   United Kingdom .

OTHER PUBLICATIONS

Bosch Technische Berichte (Feb. 1982) p. 87.

*Primary Examiner*—Richard E. Gluck
*Attorney, Agent, or Firm*—Edwin E. Greigg; Ronald E. Greigg

[57] ABSTRACT

A reciprocating pump including a piston through which fluid can flow. The piston includes an inlet valve which presses a valve ball against a valve seat in a longitudinal bore in the piston. One end of the piston has a cap-shaped support elements attached thereto against which the inlet valve spring is supported and which engage around an end behind an undercut in the piston.

25 Claims, 3 Drawing Sheets

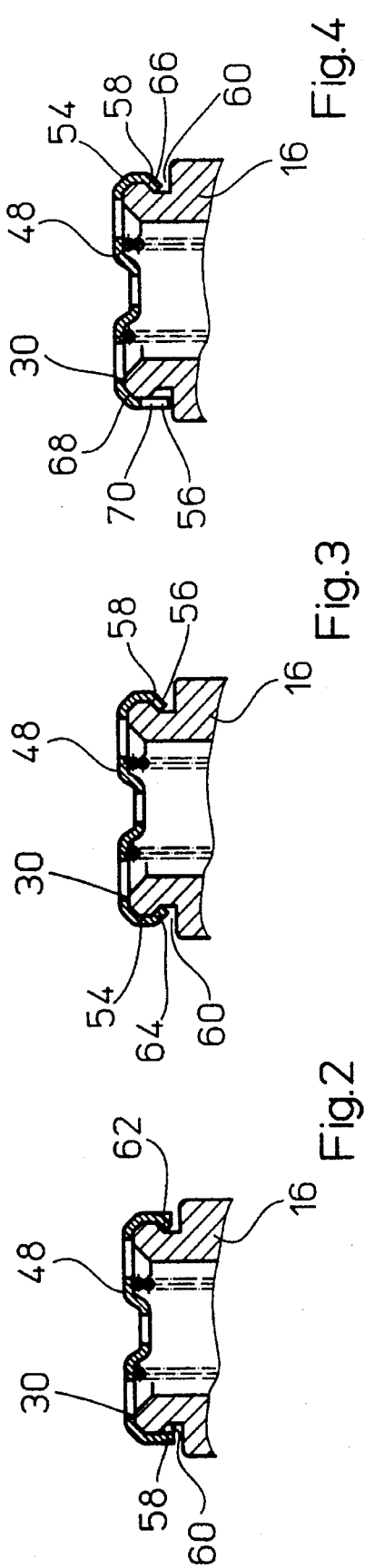

RECIPROCATING PUMP

DESCRIPTION

Prior Art

The invention relates to a reciprocating pump as set forth hereinafter.

A reciprocating pump of this kind is known from GB Patent Specification 1 072 050. The known reciprocating pump has a piston which is guided in a cylinder bore in a pump casing for movement in its longitudinal direction. The piston can be driven in a reciprocating movement by means of a rotationally drivable eccentric.

The piston is provided with a longitudinal bore for the passage of fluid. That end of said bore facing the eccentric is in communication with a fluid reservoir and forms a suction side of the reciprocating pump.

An inlet valve is housed in the piston of the known reciprocating pump; a valve seat is formed in the longitudinal bore. A ball acting as the inlet valve element is pressed against the valve seat by a spring element, which, in the known reciprocating pump, is a helical compression spring. The housing of the inlet valve in the piston gives rise to a small dead space and to a compact construction of the reciprocating pump.

At that end of the piston remote from the eccentric, the longitudinal bore leads into a displacement or compression space. At this end, a disk, against which the spring element is supported, is attached to the piston. The disk is provided with through holes for the passage of fluid. In the specification mentioned, the method of fastening the disk to the piston is not disclosed.

ADVANTAGES OF THE INVENTION

In the reciprocating pump according to the invention, the spring element of the inlet valve is supported against the bottom of a cap-shaped support element which is attached to that end of the piston remote from the eccentric, over the mouth of the longitudinal bore. The bottom is provided with a plurality of apertures for the passage of fluid. It merges into a peripheral wall which has the shape of a hollow cylinder and by means of which the support element engages around the end of the piston. At individual points on the periphery or over the entire periphery, a free edge of the peripheral wall of the support element extends radially inwards and engages behind an undercut in an external peripheral surface of the piston. The support element can be attached to the piston by elastic deformation during assembly, to form a snap or catch connection. The support element can also be attached to the piston by forming.

The reciprocating pump according to the invention has the advantage that its inlet valve can be produced inexpensively and is suitable for automatic assembly.

The subject matter relates to advantageous developments and improvements of the invention indicated hereinafter.

BRIEF DESCRIPTION OF THE DRAWINGS

The invention is explained more fully below with reference to embodiments illustrated in the drawing, in which:

FIGS. 2 to 4 show various possible ways of attaching a support element to a piston in the reciprocating pump illustrated in FIG. 1.

DETAILED DESCRIPTION OF THE EXEMPLARY EMBODIMENTS

Figure 1:
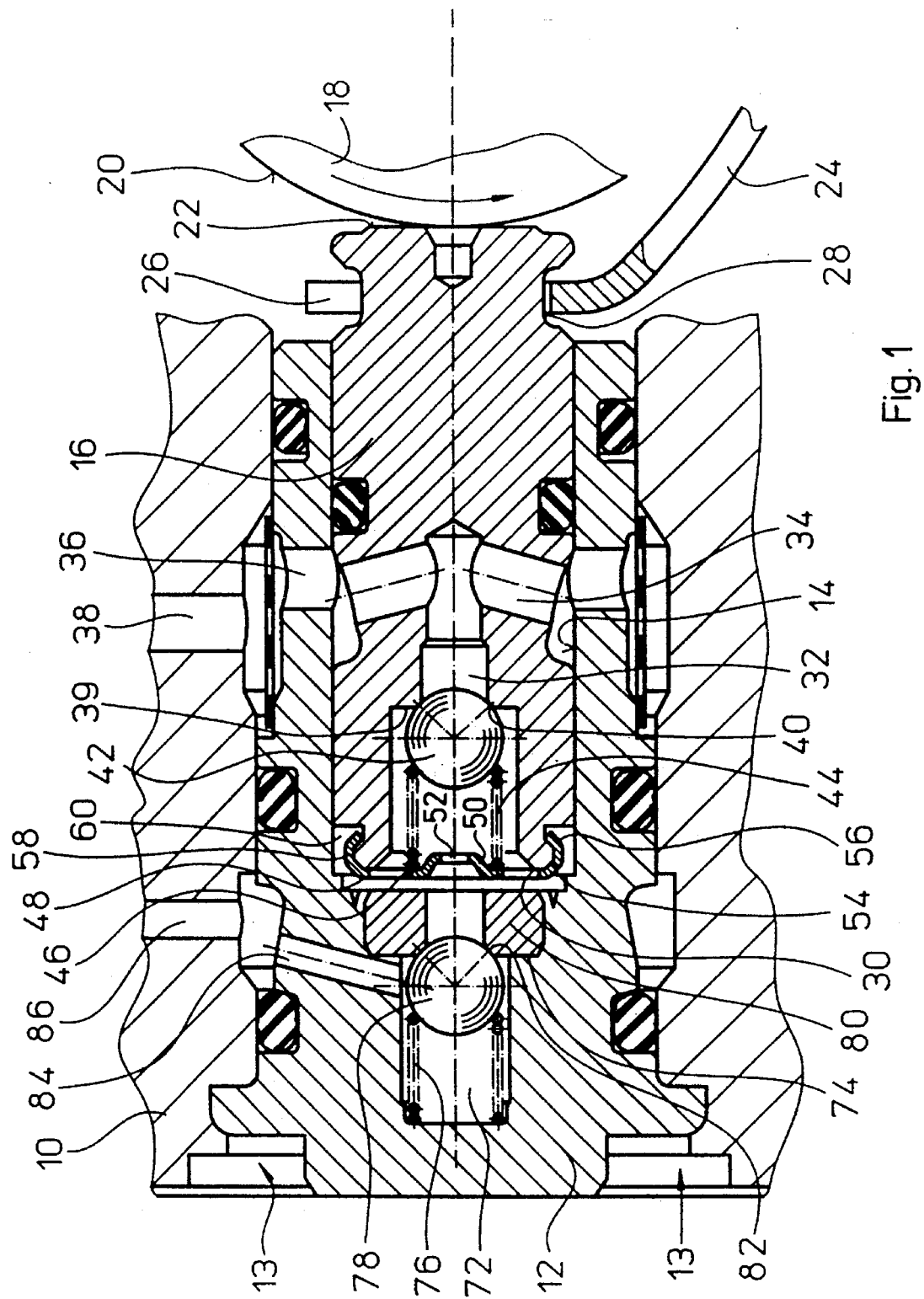
FIG. 1 shows a longitudinal section through a reciprocating pump according to the invention.

FIG. 1 shows an embodiment of a reciprocating pump according to the invention. Said pump has a casing 10 in which a cylinder 12 is fastened by caulking casing material 13. A piston 16 is guided in a cylinder bore 14 for sliding in the axial direction.

The piston 16 is driven by means of an eccentric 18, whose peripheral surface 20 presses against an end face 22 of the piston 16, said end face projecting out of the pump casing 10 and the cylinder 12. A clip spring 24 forming at one end a fork 26, by which the clip spring engages a groove 28 in an end of the piston 16 projecting out of the pump casing 10 and the cylinder 12, holds the end face 22 of the piston 16 in contact with the eccentric 18. Rotation of the eccentric 18 drives the piston 16 in a reciprocating stroke movement in the cylinder bore 14.

Starting from its end 30 remote from the eccentric 18, the piston 16 is provided with a longitudinal blind bore 32 ending in the middle region of the piston 16. At that end of the longitudinal bore 32 which is situated in the interior of the piston 16, the piston is provided with transverse bores 34 which are in communication, via transverse bores 36 in the cylinder 12, with a suction duct 38 of the pump casing 10.

An inlet valve is housed in the piston 16: in the direction of its closed end the longitudinal bore 32 is narrowed at one point by means of a step. At this step 39, a valve seat 40 is formed for the inlet valve. A ball 42 forms an inlet valve element, which is pressed by a helical compression spring 44 against the valve seat 40. The helical compression spring 44 is supported on the bottom 46 of a cap-shaped support element 48 which is attached to the end 30 of the piston 16 remote from the eccentric 18. At its center, the bottom 46 has a hump-shaped protuberance 50 which extends into the longitudinal bore 33 and whose outside diameter corresponds to the inside diameter of the helical compression spring 44. This protuberance 50 positions the helical compression spring 44 in the radial direction. The bottom 46 has a plurality of apertures 52 for the passage of fluid.

The bottom 46 of the cap-shaped support element 48 merges into a low peripheral wall 54 which has the shape of a hollow cylinder and whose free edge 56 extends radially inwards. By this inwardly extending edge 56, the support element 48 engages behind an undercut in the piston 16, so that the support element 48 is fastened to the end 30 of the piston 16 remote from the eccentric 18. The undercut 58 is formed by a groove 60 in the periphery of the piston 16. At the groove 60, the piston 16 narrows towards the end 30 remote from the eccentric 18. The outside diameter of the support element 48 is slightly smaller than the outside diameter of the piston 16, so that the support element 48 is not in contact with the cylinder bore 14.

Various possible ways of attaching the support element 48 to the piston 16 are explained below with the aid of FIGS. 2 to 4.

In the embodiment illustrated in FIG. 2, in order to form the radially inwardly extending edge 56 of the support element 48, the peripheral wall 54 of the support element 48 has been provided with indentations 62 at a plurality of points on its periphery after the support element 48 has been pushed onto the end 30 of the piston 16 remote from the eccentric 18. The indentations 62 project into the circumferential groove 60 in the piston 16 and engage behind the undercut 58 formed in the piston by the groove 60.

In the embodiment illustrated in FIG. 3, the free edge 56 of the peripheral wall 54 of the support element 48 is deformed, by edge-forming over its entire periphery, to extend into the groove 60 in the piston 16, so that this free edge 56 engages behind the undercut 58 in the piston 16.

While, in the embodiments of the invention illustrated in FIGS. 2 and 3, the support element 48 is attached to the piston 16 by forming after the support element 48 has been pushed onto the end 30 of the piston 16 remote from the eccentric 18, in the embodiment of the invention illustrated in FIG. 4 the support element 48 is attached to the piston 16 by means of a catch connection, the support element 48 being elastically expanded during its installation. At a plurality of points on its periphery, the free edge 56 of the peripheral wall 54 of the support element 48 is shaped to form catch claws 66 which project radially inwards and which engage behind the undercut 58 in the piston 16. In order to install the support element 48 on the piston 16, it is pushed onto the end 30 of the piston 16 remote from the eccentric 18. For this purpose, the piston 16 has on its end 30 a bevel 68, over which the catch claws 66 slip on and are pressed apart in the radial direction. The cap-shaped support element 48 expands elastically. In order to facilitate this expansion, the peripheral wall 54 of the support element 48 can be provided with slits 70, which lead out onto the free edge 56 of the support element 48. When the support element 48 has been completely pushed onto the piston 16, the catch claws 66 engage in the groove 60 in the piston 16 and engage behind the undercut 58 in the piston 16, thus joining the support element 48 to the piston 16.

The reciprocating pump (FIG. 1) has an outlet valve, which is housed in the cylinder 12 as an extension of the piston 16, at that end of the latter remote from the eccentric 18. For this purpose, the cylinder 12 has a blind bore 72 which has an annular shoulder 74 and leads into the cylinder bore 14. A helical compression spring 76 presses a valve ball 78 against a valve seat ring 80, which is inserted into the blind bore 72 and lies against the annular shoulder 74. The valve seat ring 80 is fastened in the cylinder 12 by caulking the material of the cylinder. It has a valve seat 82. A bore 84 extending approximately radially in the cylinder 12 connects the blind bore 72 to an outlet duct 86 in the pump casing 10.

Figure 5:
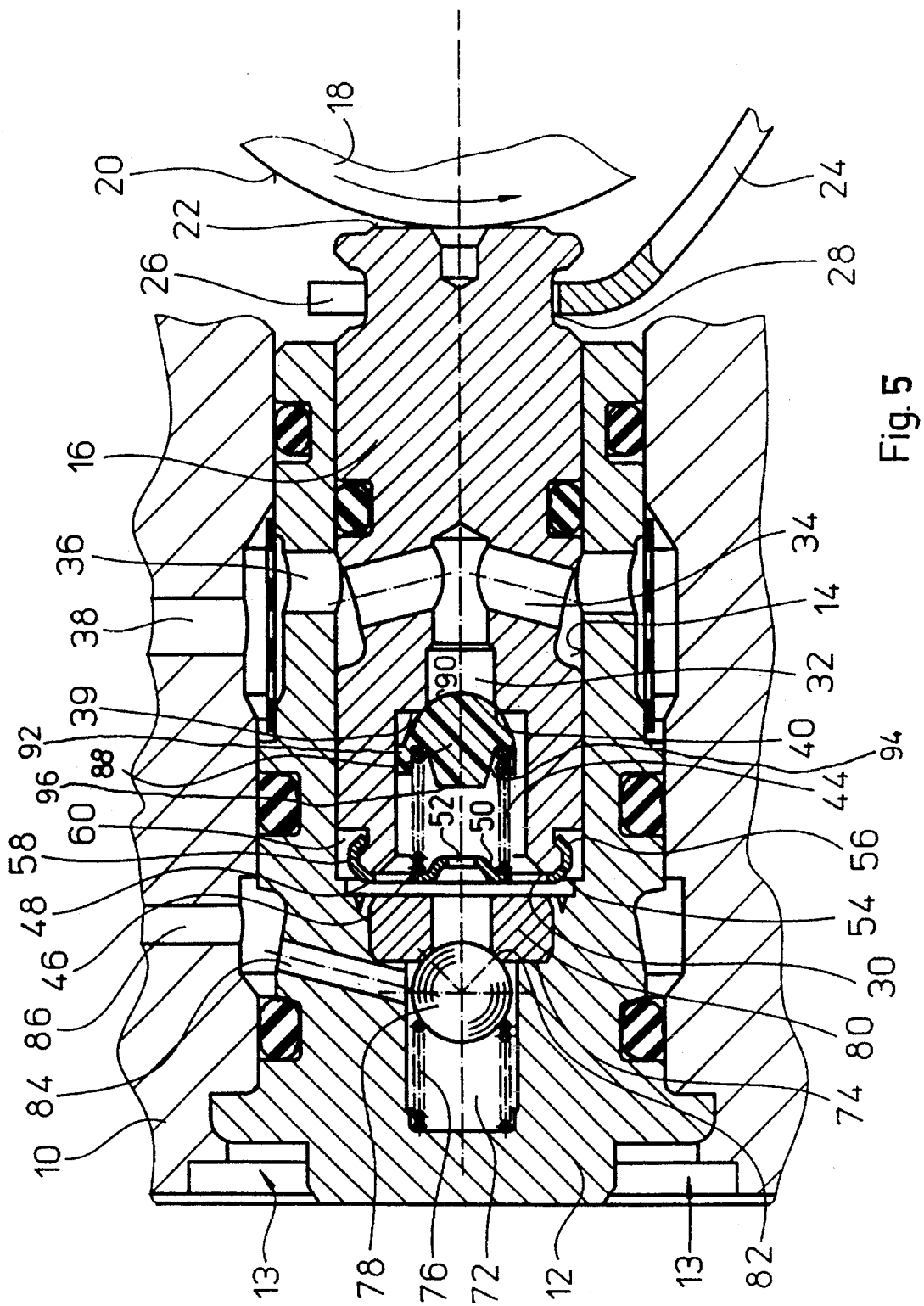
FIG. 5 shows a longitudinal section through a reciprocating pump according to the invention, which has a different inlet valve element.

The embodiment of a reciprocating pump, according to the invention, which is illustrated in FIG. 5 has an inlet valve element 88 different from that of the reciprocating pump shown in FIG. 1. Otherwise, these two reciprocating pumps are of identical construction. For like component parts, the same reference numerals are used in FIG. 5 as in FIG. 1. In order to avoid repetitions, reference is made to the description given above.

The inlet valve element 88 is rotationally symmetrical in shape. It has a spherical cap-shaped sealing surface 90, which is pressed by the helical compression spring 44 against the conical valve seat 40 in the longitudinal bore 32 in the piston 16. On its outer periphery, the inlet valve element 88 is provided with three guide webs 92 which are distributed uniformly over its periphery, extend axially parallel, project radially and are integral with it. These three guide webs 92 guide the inlet valve element 88 in the longitudinal bore 32 in the piston 16 for sliding in the axial direction. Fluid which is to be let into the reciprocating pump can flow through around the inlet valve element 88, over its periphery on the outside between the guide webs 92.

In an end face 96 remote from its sealing surface 90, the inlet valve element 88 is provided with a deep, circular axial groove 94 to serve as a spring seat for the helical compression spring 44. The inlet valve element 88 is an injection molding. This inlet valve element 88 has the advantage over a ball that it can be produced at a substantially lower cost, because the necessary removal of an injection molding flash on the equator of a ball used as the inlet valve element is very expensive. In addition, the inlet valve element 88 of injection molded plastics material is substantially lighter than an inlet valve element made of steel. Its inertia is consequently much lower, thus providing the advantage of rapid opening at lower fluid pressure. The filling of a self-priming reciprocating pump in particular is thereby improved.

The foregoing relates to preferred exemplary embodiments of the invention, it being understood that other variants and embodiments thereof are possible within the spirit and scope of the invention, the latter being defined by the appended claims.

We claim:

1. A reciprocating pump comprising a piston which is driven to make a stroke movement in a cylinder bore, an inlet valve which has an inlet valve element and an inlet valve spring, both of which are housed in a longitudinal bore in the piston, the inlet valve spring presses the inlet valve element against an inlet valve seat formed in the longitudinal bore in the piston, wherein the inlet valve spring (44) is supported against a cap-shaped support element (48) which is attached to one end (30) of the piston (16) and, from an outside, engages therearound behind an undercut (58) in an external peripheral surface of the piston (16).

2. A reciprocating pump as claimed in claim 1, wherein the support element (48) has at least one aperture (52) for the passage of fluid.

3. A reciprocating pump as claimed in claim 1, wherein the support element (48) forms a snap connection to the piston (16).

4. A reciprocating pump as claimed in claim 2, wherein the support element (48) forms a snap connection to the piston (16).

5. A reciprocating pump as claimed in claim 3, wherein the support element (48) has a peripheral wall (54) having at least one slit (70) which leads out onto an open side of the support element (48).

6. A reciprocating pump as claimed in claim 4, wherein the support element (48) has a peripheral wall (54) having at least one slit (70) which leads out onto an open side of the support element (48).

7. A reciprocating pump as claimed in claim 1, wherein the end (30) of the piston (16) to which the support element (48) is attached has a bevel (68).

8. A reciprocating pump as claimed in claim 2, wherein the end (30) of the piston (16) to which the support element (48) is attached has a bevel (68).

9. A reciprocating pump as claimed in claim 3, wherein the end (30) of the piston (16) to which the support element (48) is attached has a bevel (68).

10. A reciprocating pump as claimed in claim 5, wherein the end (30) of the piston (16) to which the support element (48) is attached has a bevel (68).

11. A reciprocating pump as claimed in claim 1, wherein the support element (48) is joined to the piston (16) by forming.

12. A reciprocating pump as claimed in claim 2, wherein the support element (48) is joined to the piston (16) by forming.

13. A reciprocating pump as claimed in claim 1, wherein the inlet valve element (42) is a ball.

14. A reciprocating pump as claimed in claim 2, wherein the inlet valve element (42) is a ball.

15. A reciprocating pump as claimed in claim 3, wherein the inlet valve element (42) is a ball.

16. A reciprocating pump as claimed in claim 5, wherein the inlet valve element (42) is a ball.

17. A reciprocating pump as claimed in claim 7, wherein the inlet valve element (42) is a ball.

18. A reciprocating pump as claimed in claim 11, wherein the inlet valve element (42) is a ball.

19. A reciprocating pump as claimed in claim 1, wherein the inlet valve element (88) has a spherical sealing surface (90).

20. A reciprocating pump as claimed in claim 2, wherein the inlet valve element (88) has a spherical sealing surface (90).

21. A reciprocating pump as claimed in claim 3, wherein the inlet valve element (88) has a spherical sealing surface (90).

22. A reciprocating pump as claimed in claim 5, wherein the inlet valve element (88) has a spherical sealing surface (90).

23. A reciprocating pump as claimed in claim 7, wherein the inlet valve element (88) has a spherical sealing surface (90).

24. A reciprocating pump as claimed in claim 11, wherein the inlet valve element (88) has a spherical sealing surface (90).

25. A reciprocating pump as claimed in claim 19, wherein the inlet valve element (88) has three guide webs (92) projecting in a radial direction.

* * * * *